(12) United States Patent
Sharma et al.

(10) Patent No.: US 9,317,156 B2
(45) Date of Patent: Apr. 19, 2016

(54) MOBILE DEVICE REJECTION OF UNINTENTIONAL TOUCH SENSOR CONTACT

(75) Inventors: Sangita Sharma, Portland, OR (US); David Graumann, Portland, OR (US); Lakshman Krishnamurthy, Portland, OR (US); Jameson H. Williams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 13/995,459

(22) PCT Filed: Sep. 30, 2011

(86) PCT No.: PCT/US2011/054360
§ 371 (c)(1),
(2), (4) Date: Jun. 18, 2013

(87) PCT Pub. No.: WO2013/048461
PCT Pub. Date: Apr. 4, 2013

(65) Prior Publication Data
US 2013/0265269 A1    Oct. 10, 2013

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/0488* (2013.01); *G06F 3/041* (2013.01); *G06F 3/044* (2013.01); *G06F 15/18* (2013.01)

(58) Field of Classification Search
CPC ....... G06F 3/0416; G06F 3/041; G06F 3/044; G06F 15/18

USPC .......................................... 345/173, 174, 175
See application file for complete search history.

(56) References Cited

U.S. PATENT DOCUMENTS 6,630,922 B2   10/2003   Fishkin et al.
7,561,146 B1    7/2009   Hotelling
(Continued)

FOREIGN PATENT DOCUMENTS

JP    1995036752    2/1995
JP    1999039093    2/1999
(Continued)

OTHER PUBLICATIONS

International Search Report and Written Opinion of the International Searching Authority dated Oct. 4, 2012, in International Patent Application No. PCT/US2011/068221, 11 pages.
(Continued)

*Primary Examiner* — Fred Tzeng
(74) *Attorney, Agent, or Firm* — Blakely, Sokoloff, Taylor & Zafman LLP

(57) ABSTRACT

Mobile device rejection of unintentional sensor contact. An embodiment of a mobile device includes a first touch sensor to detect contact by a user of the mobile device for input of gestures by the user, a memory to store indicators of unintentional contact to the first touch sensor, and a processor to evaluate contact to the first touch sensor. The processor compares a contact with the first touch sensor to the indicators of unintentional contact to determine if the contact is unintentional, and the mobile device rejects the contact as an input to the mobile device if the contact is determined to be unintentional and accepts the contact as an input to the mobile device if the contact is determined to be intentional.

21 Claims, 6 Drawing Sheets

(51) Int. Cl.
*G06F 3/044* (2006.01)
*G06F 15/18* (2006.01)

(56) References Cited

U.S. PATENT DOCUMENTS

| | | |
|---|---|---|
| 8,055,305 B2 | 11/2011 | Cho et al. |
| 2009/0225044 A1 | 9/2009 | Jeon et al. |
| 2010/0085317 A1 | 4/2010 | Park et al. |
| 2010/0151916 A1 | 6/2010 | Baek et al. |
| 2010/0315337 A1 | 12/2010 | Ferren et al. |
| 2010/0315356 A1 | 12/2010 | Ferren et al. |
| 2011/0069024 A1 | 3/2011 | Kim |
| 2011/0312349 A1 | 12/2011 | Forutanpour et al. |
| 2012/0158629 A1* | 6/2012 | Hinckley ................ G06F 3/038 706/15 |
| 2012/0182238 A1* | 7/2012 | Lee ............................. 345/173 |
| 2013/0050133 A1* | 2/2013 | Brakensiek et al. .......... 345/174 |
| 2013/0069911 A1* | 3/2013 | You ............................. 345/175 |

FOREIGN PATENT DOCUMENTS

| | | |
|---|---|---|
| JP | 2004-177993 | 6/2004 |
| JP | 2006146936 | 6/2006 |
| JP | 2008-052062 | 3/2008 |
| JP | 2008-511077 | 4/2008 |
| JP | 2008532185 | 8/2008 |
| JP | 2009-169820 | 7/2009 |
| JP | 2010-026638 | 2/2010 |
| JP | 2010-213169 | 9/2010 |
| JP | 2011100486 | 5/2011 |
| KR | 10-2007-0071917 | 7/2007 |
| KR | 10-2009-0026977 | 3/2009 |
| WO | WO-2011101940 | 8/2011 |

OTHER PUBLICATIONS

International Search Report and Written Opinion of the International Searching Authority dated May 17, 2012, in International Patent Application No. PCT/US11/54360, 10 pages.

Kee Eung Kim et al., "Recognition of Grip Patterns by Using Capacitive Touch Sensors," IEEE ISIE 2006, Jul. 9-12, 2006, Montréal, pp. 2936-2941.

Notice of Reasons for Rejection dated Feb. 24, 2015 (+ English translation), in Japanese Patent Application No. 2014-533272, 6 pages.

Office Action mailed Jan. 7, 2015, in U.S. Appl. No. 13/997,160, 11 pages.

Final Office Action mailed Jul. 16, 2015, in U.S. Appl. No. 13/997,160, 13 pages.

Notice of Reasons for Rejection mailed Aug. 25, 2015 (+ English translation), in Japanese Patent Application No. 2014-533272, 6 pages.

U.S. Appl. No. 13/997,160, Non-Final Office Action mailed Feb. 24, 2016, 11 pages.

Japanese Patent Application No. 2014-533272 Decision to Grant, Issued Mar. 1, 2016, 3 pages.

* cited by examiner

MOBILE DEVICE REJECTION OF UNINTENTIONAL TOUCH SENSOR CONTACT

CROSS-REFERENCE TO RELATED APPLICATION

This application is a national phase of PCT/US2011/054360 filed Sep. 30, 2011, which application is incorporated herein by reference in its entirety.

TECHNICAL FIELD

Embodiments of the invention generally relate to the field of electronic devices and, more particularly, to mobile device rejection of unintentional touch sensor contact.

BACKGROUND

Mobile devices, including cellular phones, smart phones, mobile Internet devices (MIDs), handheld computers, personal digital assistants (PDAs), and other similar devices, may include one more touch sensors for operation to allow entry of inputs to the mobile device.

Such a mobile device will commonly be grasped in a hand for operation. In many circumstances, the holding of the device will be followed by an input into one or more applications or services, or reading information from the screen of the mobile device.

However, depending on the placement of touch sensors on a mobile device, the support of the device in the user's hand may inadvertently make contact with a touch sensor. In this situation, a mobile device will commonly detect a touch on the touch sensor when the user of the device does not intend any action, and in fact may not be aware that touch sensor is being contacted. This can result in erroneous entries to the mobile device by the user.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
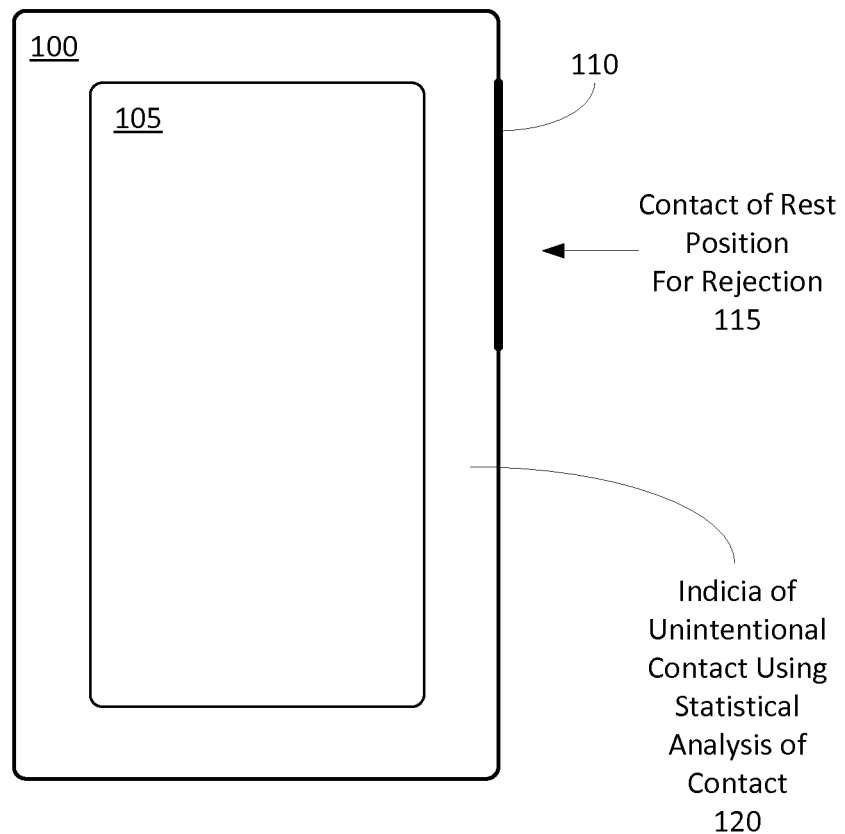
FIG. 1 illustrates an embodiment of a mobile device providing rejection of unintentional contact to touch sensors.

Embodiments of the invention are generally directed to mobile device rejection of unintentional touch sensor contact.

As used herein:

"Mobile device" means a mobile electronic device or system including a cellular phone, smart phone, mobile Internet device (MID), handheld computers, personal digital assistants (PDAs), and other similar devices.

"Touch sensor" means a sensor that is configured to provide input signals that are generated by the physical contact of a user, proximity of a user, or both (which may generally be referred to as contact with the touch sensor), including a sensor that detects contact by a thumb or other finger of a user of a device or system, including a mobile device. A touch sensor may include, but is not limited to, a capacitive sensor, which may detect the contact of a finger or hand on the capacitive sensor. A touch sensor may include a sensor used for multiple different purposes in the operation of a device or system.

"Side touch sensor" means a touch sensor that detects contact of a user, including a user's finger or hand, on at least one side of a device or system including a mobile device. A side touch sensor includes a touch sensor that is physically located at least in part on one at least one side of the mobile device, or a side touch sensor that detects contact with a user on the side of the mobile device without being physically located on the side on the mobile device.

When using a mobile device having a touch sensor on the side, at times the user might unintentionally interact with the sensor. For example, when the user is supporting the device on the user's palm to simply read information on the touch screen, or to interact with the touch screen using the thumb of the hand supporting the device. In cases such as this, the palm of the user's hand can, for example, easily wrap around the lower end of the touch sensor, causing it to appear as a touch on the side touch sensor.

In another example, a user may simply rest the user's thumb on the sensor, or the index finger on the edge of the sensor, to support the device, such as while reading from the screen. This type of unintentional contact with a touch sensor may become more frequent if the touch sensor is longer in length on the side of the mobile device. In this case, the sensor might register an unintentional interaction in a lower part of the touch sensor while the user is intentionally interacting with an upper part of the sensor.

If not addressed, these unintentional interactions may become issues in at least two scenarios. In a first scenario, a user is actively trying to interact with the touch screen of a mobile device. In this case, the detected unintentional touch sensor motion may conflict with the touch screen motion, and may result in the system, for example, randomly responding to either of the two inputs or generating an error condition, thereby creating a disruption of the user experience with the mobile device.

In a second scenario, in which a mobile device utilizes a longer touch sensor, there may be both an intentional contact on an upper portion of the sensor and an unintentional contact with a lower portion of the sensor. In operation, either of the multiple touches to the touch sensor (one of which is intentional and one of which is unintentional) may randomly be triggered, again causing disruption of the experience of the user with the mobile device.

In some embodiments, a mobile device provides for rejection of unintentional touch sensor contact. In some embodiments, a mobile device addresses the described issue of unintentional contact of a side touch sensor by identifying the user intent, and masking off the unintentional interactions with the touch sensor.

In some embodiments, an apparatus, system, or method provides for analyzing the shape and movement characteristics of a resting finger/palm of a user in order to filter out these signals, and thereby avoid unintentional gestures. In some embodiments, an approach includes analyzing different long term statistics of the features extracted from the relevant sensor readings during an interaction. If the long term statistics suggest that the interaction is stationary (and thus unintentional), the interaction is suppressed. In this way, conflict with any intentional user interaction, such as the touch screen interaction or a valid finger interaction on a long sensor, is prevented.

FIG. 1 illustrates an embodiment of a mobile device providing rejection of unintentional contact to touch sensors. In some embodiments, a mobile device 100 provides for rejection of resting positions of fingers and hands on touch sensors. In some embodiments, the mobile device 100 includes a screen 105 for viewing displayed information, which may include a touch screen that provides both for presenting data and images to a user and for receiving input from the user. In some embodiments, the mobile device 100 further includes a side touch sensor 110 for the receipt of inputs from a user in the form of gestures from a user's thumb or other finger.

In some embodiments, the mobile device 100 provides for rejection of resting positions of fingers or hands of users 115 on the side touch sensor. In some embodiments, the mobile device includes indicia of unintentional contact for the mobile device 120, which may be stored in non-volatile memory, where the mobile device uses statistical analysis of the contact on the touch sensor 110 to determine whether contact should be rejection an unintentional contact on the touch sensor.

In some embodiments, the touch sensor 110 may include capacitive sensors and may also include other sensors, such as an optical sensor. See, for example, U.S. patent application Ser. No. 12/650,582, filed Dec. 31, 2009 (Optical Capacitive Thumb Control with Pressure Sensor); U.S. patent application Ser. No. 12/646,220, filed Dec. 23, 2009 (Contoured Thumb Touch Sensor Apparatus).

Figure 2:
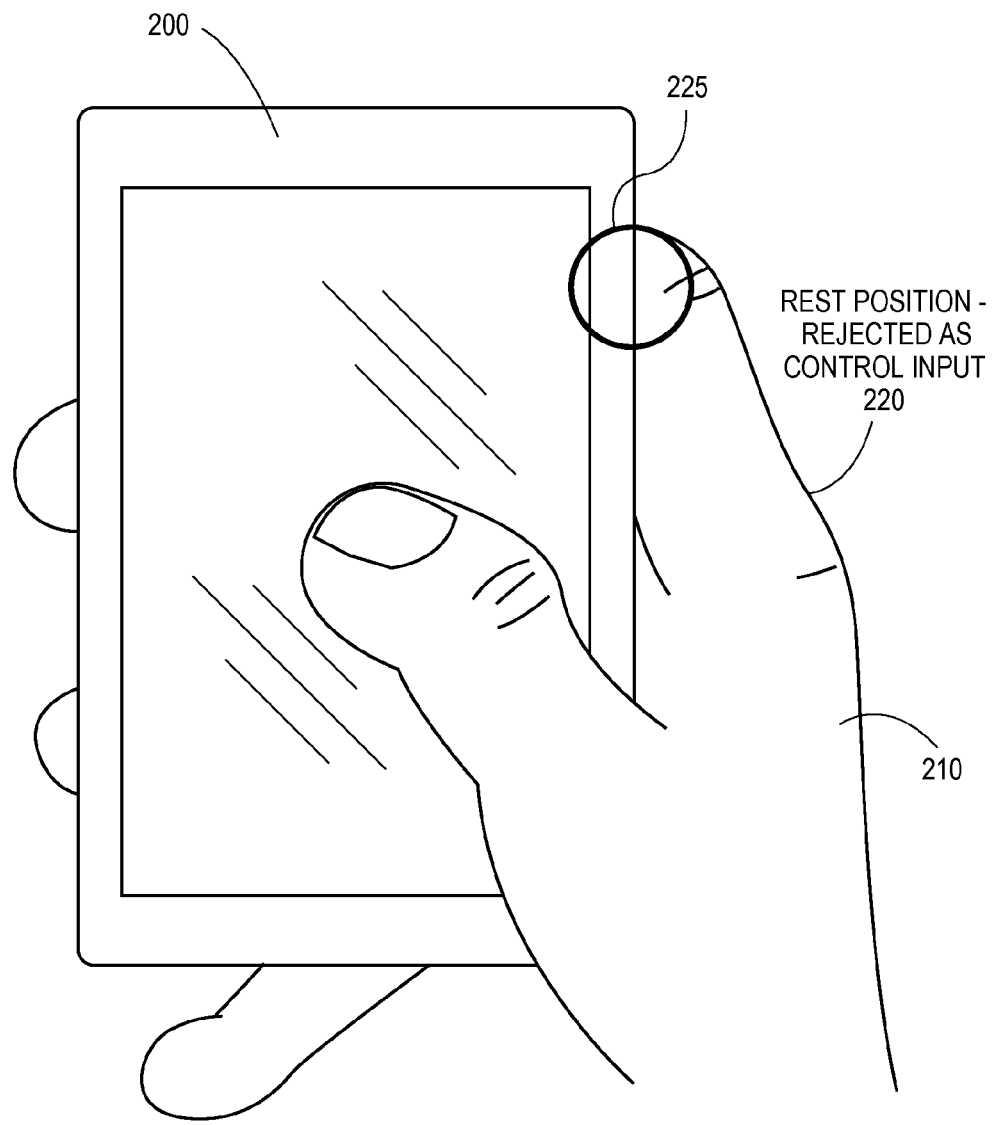
FIG. 2 illustrates rejection of rest position contact by an embodiment of a mobile device.

FIG. 2 illustrates rejection of rest position contact by an embodiment of a mobile device. In some embodiments, a mobile device 200 includes a side touch sensor (obscured in this diagram). In operation the hand 210 of a user of the mobile device 200 may inadvertently contact the side touch sensor when the hand is in a rest position 220 to support the mobile device 200.

In some embodiments, the mobile device provides for rejection of the contact based on statistical analysis of the contact over a time period. For example, in this illustration the contact point 225 is a large area on the side touch sensor, and the contact will tend to be generally non-moving. In some embodiments, statistical analysis of these and related factors are used to determine the contact is inadvertent and to reject signals from this contact of the side touch sensor.

Figure 3:
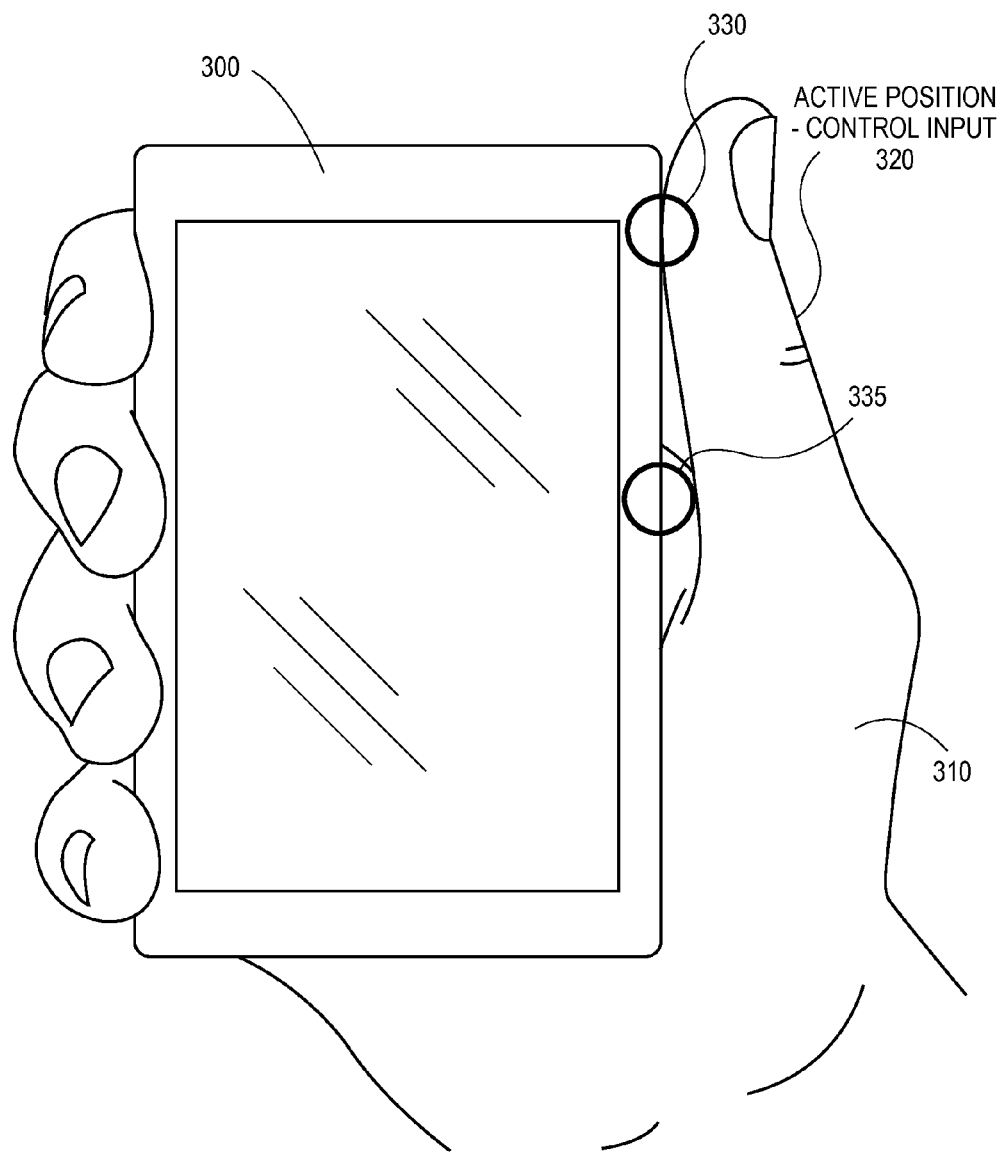
FIG. 3 illustrates rejection of incidental contact as input by an embodiment of a mobile device.

FIG. 3 illustrates rejection of incidental contact as input by an embodiment of a mobile device. In some embodiments, a mobile device 300 includes a side touch sensor (obscured in this diagram). In this example, the side touch sensor may be long enough in length that it is possible for there to be inadvertent contact on the bottom of the side touch sensor. In operation the hand 310 of a user of the mobile device 300 may contact the side touch sensor at multiple locations when the hand is in an active position for control input 320. In this illustration, the thumb of the user is contacting the side touch sensor at a first point 330 to provide input to the mobile device 300. However, the hand of the user may also contact the side touch sensor at a second point 335 because of the length of the side touch sensor, the particular size of the user's hand, and the particular manner in which the mobile device 300 is being held in the user's hand. In this circumstance, the second contact 335 may be constant, but also may occur on and off as the user changes the first contact point 330 to provide input to the mobile device 300.

In some embodiments, the mobile device provides for rejection of the second contact point 335 based on statistical analysis of the contact over a time period. For example, in this illustration the second contact point 335 is located in a lower area of the side touch sensor, and is in addition to the first contact point 330. In some embodiments, statistical analysis, including knowledge that there are two contact points and that the second contact point remains at the lower end of the side touch sensor, is used to determine the second contact 335 is inadvertent and to reject signals from this contact of the side touch sensor.

Figure 4:
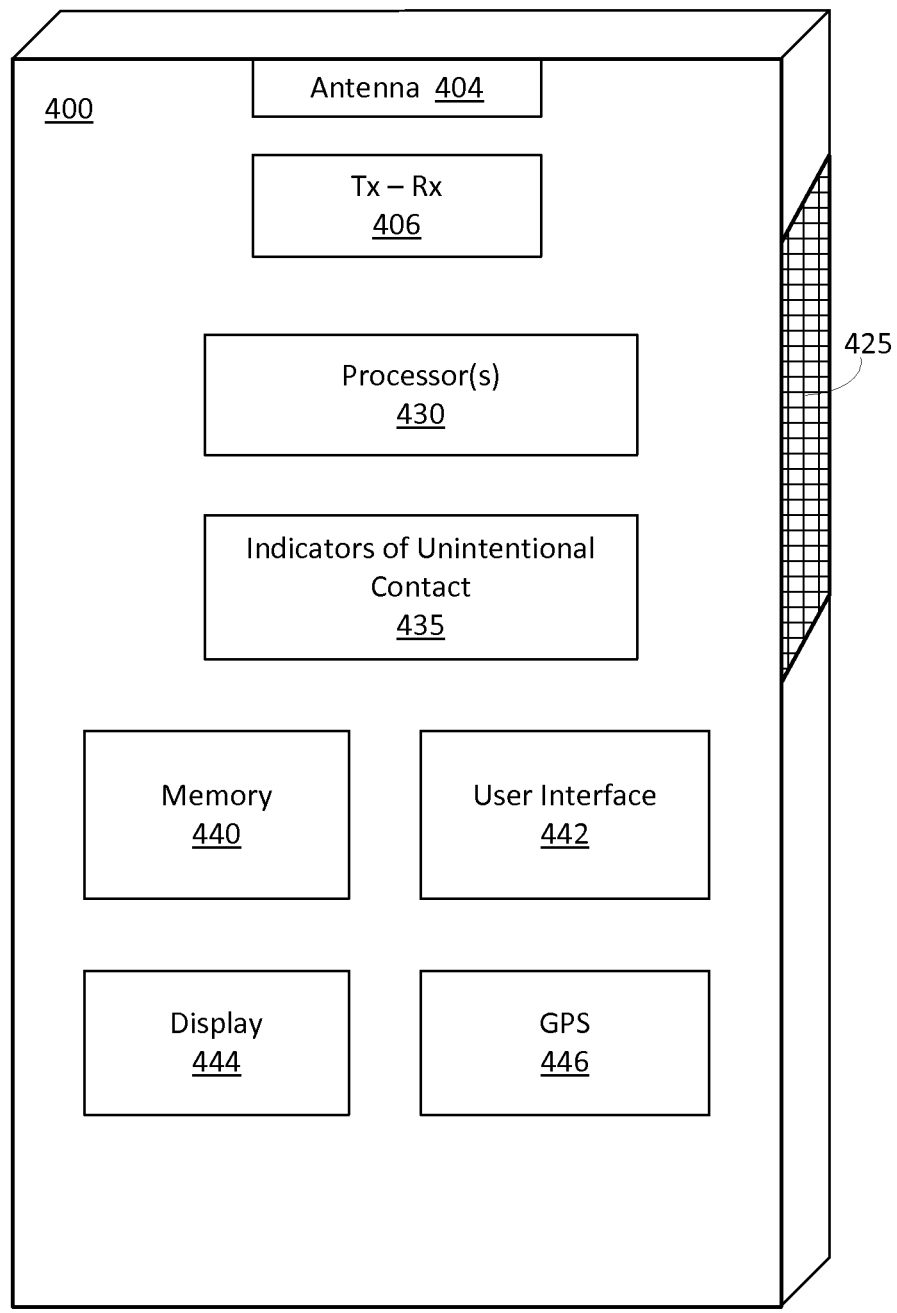
FIG. 4 is an illustration of an embodiment of elements of a mobile device that provides rejection of unintentional contact to touch sensors.

FIG. 4 is an illustration of an embodiment of elements of a mobile device that provides rejection of unintentional contact to touch sensors. In some embodiments, the mobile device 400 includes a side touch sensor 425 for use in providing input to the mobile device through gesture operations of a thumb or other finger of the user. In some embodiments, the mobile device 400 further includes one or more processors 430 for the processing of signals and commands, including inputs received from the side touch sensor.

In some embodiments, the mobile device 400 includes a control module or algorithm 435 to reject inadvertent contacts to the side touch sensor 425. In some embodiments, the mobile device collects data generated by the side touch sensor 425 from contact to such sensor, and performs statistical analysis for such contact over a time period. In some embodiments, the statistical analysis includes but is not limited to:

(1) Determination of the size of a contact point, where, for example, a large contact point may be an indicator of a hand of a user being wrapped around the mobile device 400 and making inadvertent contact with the side touch sensor 425;

(2) Determination of the motion of a contact point, where, for example, the lack of motion of certain contact points may be an indicator that the hand of the user is in a rest position and contact with the side touch sensor 425 is being used to support the mobile device;

(3) Determination of the shape of the contact point on the side touch sensor 425, where, for example, a shape may be an indicator of a hand wrapped around the mobile device 400; and (4) Determination of the number of contact points on the side touch sensor 425, where, for example, a second contact point on a lower portion of the side touch sensor 425 below a first contact point may be an indicator of inadvertent contact with the side touch sensor when providing input to the mobile device 400.

The mobile device may further include, for example, one or more transmitters and receivers 406 for the wireless transmission and reception of data, as well as one or more antennas 404 for such data transmission and reception; a memory 440 for the storage of data; a user interface 442, including a graphical user interface (GUI), for communications between the mobile device 400 and a user of the device; a display circuit or controller 444 for providing a visual display to a user of the mobile device 400; and a location circuit or element, including a (GPS) circuit or element 446.

Figure 5:
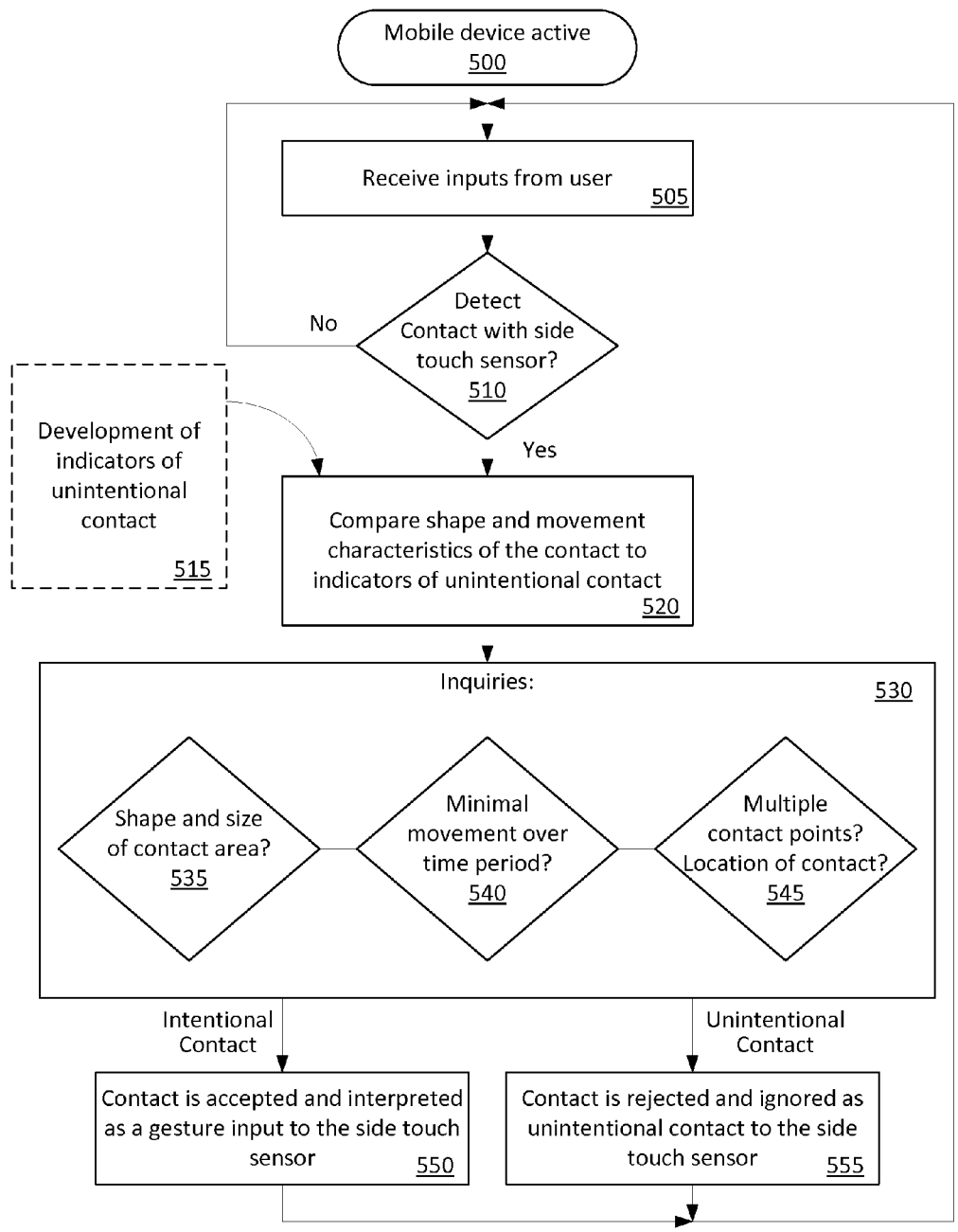
FIG. 5 is a flowchart to illustrate an embodiment of a process for transforming sensor data to represent user intent and perception based on contact area.

FIG. 5 is a flowchart to illustrate an embodiment of a process for transforming sensor data to represent user intent and perception based on contact area. In some embodiments, upon a mobile device becoming operational 500, the mobile device may proceed with normal operations, including receipt of sensor inputs 505. In some embodiments, the sensor inputs include input from a side touch sensor. In some embodiments, indicators of unintentional contact with the side touch sensor have been developed 515, which may include empirical development of such indicators based on usage of mobile devices. In some embodiments, if the mobile device detects contact with the side touch sensor 510, there is a comparison of shape and movement characteristics to the indicators of unintentional contact 520.

In some embodiments, inquiries 530 to determine how the contact with the side touch sensor compares with indicators of unintentional contact are made, including, but not limited to, the following:

The shape and size of the contact area 535, such as a large contact area that appears to be in the shape of a hand wrapping around the mobile device;

Minimal movement of the contact area 540, such as indicating a hand holding the mobile device in a resting position; and Whether there are multiple contact points 545, such as indicating that there is first contact point that is providing input to the mobile device and a second contact, such as a contact point on a lower portion of the side touch sensor, that is indicative of a part of the hand of the user supporting the mobile device while performing gestures with the thumb or other finger of the user's hand.

In some embodiments, if the comparison of the sensor contact with the indicators of unintentional contact with the side touch sensor results in a conclusion that the contact is intentional, then the contact is accepted and interpreted as a gesture input to the side touch sensor 550. If the comparison of the sensor contact with the indicators of unintentional contact with the side touch sensor results in a conclusion that the contact is unintentional, then the contact is ignored as unintentional contact to the side touch sensor and there is no input to the mobile device 555.

Figure 6:
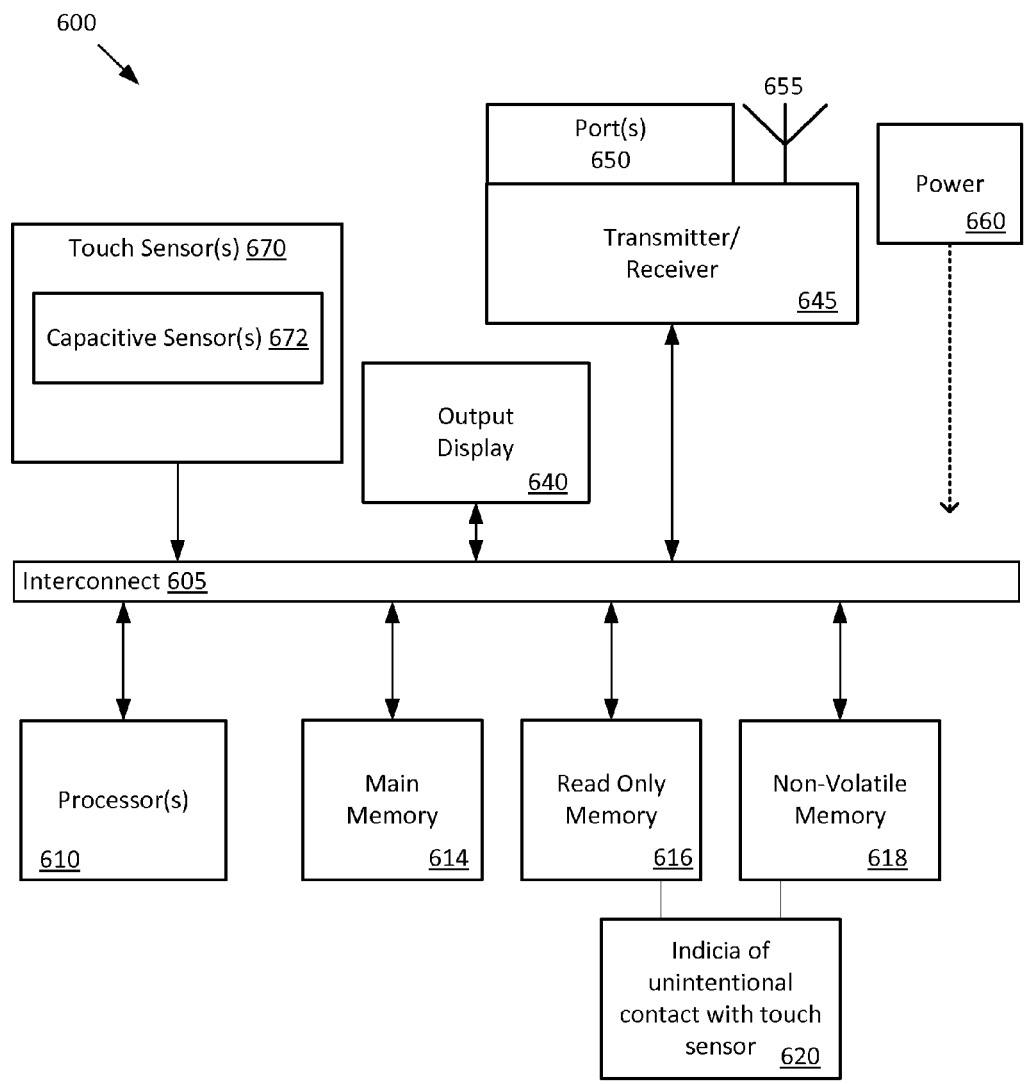
FIG. 6 illustrates an embodiment of a mobile device providing rejection of unintentional contact to touch sensors.

FIG. 6 illustrates an embodiment of a mobile device providing rejection of unintentional contact to touch sensors. In this illustration, certain standard and well-known components that are not germane to the present description are not shown. Under some embodiments, the mobile device 600 comprises an interconnect or crossbar 605 or other communication means for transmission of data. The device 600 may include a processing means such as one or more processors 610 coupled with the interconnect 605 for processing information. The processors 610 may comprise one or more physical processors and one or more logical processors. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers.

In some embodiments, the device 600 includes one or more touch sensors 670. In some embodiments, the touch sensors 670 may include capacitive sensors 672, and may include a side touch sensor, such as side touch sensor 425 as illustrated in FIG. 4. In some embodiments, the device 600 provides for rejection of unintentional contact to the side touch sensor based on analysis of the contact area, including analysis of, for example, the size, shape, and motion of the contact area, and the number of contact areas present.

In some embodiments, the device 600 further comprises a random access memory (RAM) or other dynamic storage device or element as a main memory 614 for storing information and instructions to be executed by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The device 600 also may comprise a read only memory (ROM) 616 or other static storage device for storing static information and instructions for the processors 610. The device 600 may include one or more non-volatile memory elements 618, including flash memory, for the storage of certain elements. In some embodiments, the ROM memory 616 or the non-volatile memory 618 may include storage of data regarding indicia of unintentional contact 620 for use in rejecting contact with a touch sensor that is determined to be unintentional contact by a user of the device 600.

The device 600 may also be coupled via the interconnect 605 to an output display 640. In some embodiments, the display 640 may include a liquid crystal display (LCD) or any other display technology, for displaying information or content to a user. In some environments, the display 640 may include a touch-screen that is also utilized as at least a part of an input device. In some environments, the display 640 may be or may include an audio device, such as a speaker for providing audio information.

One or more transmitters or receivers 645 may also be coupled to the interconnect 605. In some embodiments, the device 600 may include one or more ports 650 for the reception or transmission of data. The device 600 may further include one or more antennas 655 for the reception of data via radio signals.

The device 600 may also comprise a power device or system 660, which may comprise a power supply, a battery, a solar cell, a fuel cell, or other system or device for providing or generating power. The power provided by the power device or system 660 may be distributed as required to elements of the device 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a non-transitory computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A mobile device comprising:
    a side touch sensor to detect a contact with the side touch sensor over a time period performed by a user of the mobile device, wherein the side touch sensor is a capacitive touch sensor to detect contact with a side of the mobile device for input of gestures by the user;
    a memory to store indicators of unintentional contact to the touch sensor; and
    a processor to evaluate contact to the side touch sensor, wherein the processor is to compare the contact with the side touch sensor over the time period to the indicators of unintentional contact to determine if the contact is intended to be a gesture input or if the contact is unintentional, wherein the comparison includes performance of a statistical analysis of the contact with the side touch sensor over the time period, the statistical analysis including analysis of shape and movement characteristics of the contact;
    wherein the indicators of unintentional contact include data regarding motion of contact areas on the side touch sensor over the time period, and
    wherein the mobile device is to reject the contact to the side touch sensor as a gesture input to the mobile device if the contact is determined to be unintentional based on the comparison of the contact to the indicators of unintentional contact and to accept the contact as a gesture input to the mobile device if the contact is determined to be intentional.

2. The mobile device of claim 1, wherein the indicators of unintentional contact are developed by empirical study of mobile device usage.

3. The mobile device of claim 1, wherein the indicators of unintentional contact further include data regarding contact shape on the side touch sensor.

4. The mobile device of claim 3, wherein the data regarding contact shape on the side touch sensor includes data describing a shape of a hand supporting the mobile device in a resting position.

5. The mobile device of claim 1, wherein the indicators of unintentional contact further include data regarding size of a contact area for the contact on the side touch sensor.

6. The mobile device of claim 1, wherein the indicators of unintentional contact further include data regarding a number of contact areas on the side touch sensor.

7. The mobile device of claim 6, wherein the data regarding a number of contact areas includes an indicator of multiple contact areas on the side touch sensor resulting for a user holding a mobile device in a hand while contacting the side touch sensor with a thumb or other finger of the hand.

8. The mobile device of claim 1, wherein the data regarding motion of contact areas on the side touch sensor over the time period includes data regarding a stationary contact area for a mobile device supported in a user hand.

9. A method comprising:
    detecting a contact over a time period with a side touch sensor of a mobile device, the side touch sensor providing for input of gestures by a user of the mobile device, wherein the side touch sensor is a capacitive touch sensor to detect contact with a side of the mobile device;
    comparing the contact with the side touch sensor over the time period with indicators of unintentional contact with the mobile device, wherein the comparison includes performance of a statistical analysis of the contact with the side touch sensor over the time period, the statistical analysis including analysis of shape and movement characteristics of the contact, wherein the indicators of unintentional contact include data regarding motion of contact areas on the side touch sensor over the time period;
    if the comparison of the contact to the side touch sensor with the indicators of unintentional contact indicates that the contact is unintentional, rejecting the contact as a gesture input to the mobile device; and
    if the comparison of the contact with the indicators of unintentional contact indicates that the contact is intentional, accepting the contact as a gesture input to the mobile device.

10. The method of claim 9, wherein the indicators of unintentional contact are developed by empirical study of mobile device usage.

11. The method of claim 9, wherein the indicators of unintentional contact further include data regarding contact shape on the side touch sensor.

12. The method of claim 11, wherein the data regarding contact shape on the side touch sensor includes data describing a shape of a hand supporting the mobile device in a resting position.

13. The method of claim 9, wherein the indicators of unintentional contact further include data regarding size of a contact area for the contact on the side touch sensor.

14. The method of claim 9, wherein the indicators of unintentional contact further include data regarding a number of contact areas on the side touch sensor.

15. The method of claim 14, wherein the data regarding a number of contact areas includes an indicator of multiple contact areas on the side touch sensor resulting for a user holding a mobile device in a hand while contacting the side touch sensor with a thumb or other finger of the hand.

16. The method of claim 9, wherein the data regarding motion of contact areas on the side touch sensor over the time period includes data regarding a stationary contact area for a mobile device supported in a user hand.

17. A mobile system comprising:
 a side touch sensor to detect a contact with the side touch sensor over a time period performed by a user with a side of the system, wherein the side touch sensor is a capacitive touch sensor to detect contact with a side of the mobile system for input of gestures by the user;
 a flash memory to store indicators of unintentional contact to the side touch sensor; and
 a processor to evaluate contact to the side touch sensor;
 wherein the processor is to compare the contact with the side touch sensor over the time period to the indicators of unintentional contact to determine if the contact is intended to be a gesture input or if the contact is unintentional, wherein the comparison includes performance of a statistical analysis of the contact with the side touch sensor over the time period, the statistical analysis including analysis of shape and movement characteristics of the contact;
 wherein the indicators of unintentional contact include data regarding motion of contact areas on the side touch sensor over the time period; and
 wherein the mobile system is to reject the contact to the side touch sensor as a gesture input to the system if the contact is determined to be unintentional based on the comparison of the contact to the indicators of unintentional contact and to accept the contact as a gesture input to the system if the contact is determined to be intentional.

18. The system of claim 17, wherein the indicators of unintentional contact include data regarding one or more of contact shape, size of contact area, and number of contact areas on the side touch sensor.

19. The system of claim 18, wherein the data regarding contact shape on the side touch sensor includes data describing a shape of a hand supporting the system in a resting position.

20. The system of claim 18, wherein data regarding a number of contact areas includes an indicator of multiple contact areas on the side touch sensor resulting for a user holding the system in a hand while contacting the side touch sensor with a thumb or other finger of the hand.

21. A non-transitory computer-readable medium having stored thereon data representing sequences of instructions that, when executed by a processor, cause the processor to perform operations comprising:
 detecting a contact over a time period with a side touch sensor of a mobile device, the side touch sensor providing for input of gestures by a user of the mobile device, wherein the side touch sensor is a capacitive touch sensor to detect contact with a side of the mobile device;
 comparing the contact with the side touch sensor over the time period with indicators of unintentional contact with the mobile device, wherein the comparison includes performance of a statistical analysis of the contact with the side touch sensor over the time period, the statistical analysis including analysis of shape and movement characteristics of the contact, wherein the indicators of unintentional contact include data regarding motion of contact areas on the side touch sensor over the time period;
 if the comparison of the contact to the side touch sensor with the indicators of unintentional contact indicates that the contact is unintentional, rejecting the contact as a gesture input to the mobile device; and
 if the comparison with the indicators of unintentional contact indicates that the contact is intentional, accepting the contact as a gesture input to the mobile device.

\* \* \* \* \*